United States Patent
Vasek et al.

(10) Patent No.: US 9,810,541 B2
(45) Date of Patent: Nov. 7, 2017

(54) METHODS AND APPARATUS FOR REDUCING THE SIZE OF RECEIVED DATA TRANSMISSION DURING VEHICLE TRAVEL

(71) Applicant: HONEYWELL INTERNATIONAL INC., Morris Plains, NJ (US)

(72) Inventors: Jiri Vasek, Brno (CZ); Zdenek Eichler, Olomouc (CZ); Matej Dusik, Brno (CZ); Jan Bilek, Jihomoravsky kraj (CZ)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/942,642

(22) Filed: Nov. 16, 2015

(65) Prior Publication Data

US 2017/0138745 A1 May 18, 2017

(51) Int. Cl.
*G01C 21/34* (2006.01)
*G06F 17/30* (2006.01)
*G06Q 10/04* (2012.01)
*G06Q 50/30* (2012.01)

(52) U.S. Cl.
CPC ....... *G01C 21/34* (2013.01); *G06F 17/30241* (2013.01); *G06Q 10/047* (2013.01); *G06Q 50/30* (2013.01)

(58) Field of Classification Search
CPC .......................... G01C 21/34; G06F 17/30241
See application file for complete search history.

(56) References Cited

U.S. PATENT DOCUMENTS

| | | | |
|---|---|---|---|
| 7,027,898 B1 | 4/2006 | Leger et al. | |
| 7,039,505 B1 * | 5/2006 | Southard | G01S 7/003 340/945 |
| 8,255,094 B2 | 8/2012 | Srinivasan et al. | |
| 8,744,747 B1 * | 6/2014 | Bailey | G01C 21/20 701/408 |
| 2004/0181340 A1 * | 9/2004 | Smith | G08B 21/10 702/3 |
| 2009/0112452 A1 | 4/2009 | Buck et al. | |
| 2011/0054776 A1 | 3/2011 | Petrov et al. | |
| 2012/0232785 A1 | 9/2012 | Wiesemann et al. | |
| 2013/0267186 A1 | 10/2013 | Agarwal et al. | |
| 2014/0039733 A1 | 2/2014 | Ren et al. | |

(Continued)

FOREIGN PATENT DOCUMENTS

| | | |
|---|---|---|
| EP | 1221588 A1 | 7/2002 |
| EP | 2650702 A1 | 10/2013 |

OTHER PUBLICATIONS

Olathe, K., "Garmin's GDL 49 Delivers Weather Data to the Cockpit," Garmin Ltd., 2001.

(Continued)

*Primary Examiner* — Truc M Do
*Assistant Examiner* — Jess Whittington
(74) *Attorney, Agent, or Firm* — Shumaker & Sieffert, P.A.

(57) ABSTRACT

A method for obtaining updated travel condition data at a vehicle is provided. The method identifies a subset of a predetermined travel route that is ahead of the vehicle, based on a selected distance quantity and a current position of the vehicle during traveling; and requests a set of data for the subset, the updated travel condition data comprising the set of data.

14 Claims, 5 Drawing Sheets

(56) References Cited

U.S. PATENT DOCUMENTS

| | | | |
|---|---|---|---|
| 2015/0211882 A1* | 7/2015 | Gumpert | G01C 21/3679 701/538 |
| 2015/0332490 A1* | 11/2015 | Coulmeau | G06T 11/206 701/3 |
| 2015/0345976 A1* | 12/2015 | Moore | G01C 21/3632 701/519 |
| 2016/0011741 A1* | 1/2016 | Khatwa | G06F 3/04817 715/765 |
| 2016/0153789 A1* | 6/2016 | Gallar | G01C 21/3635 701/408 |

OTHER PUBLICATIONS

Ipad Pilot News, "What does ADS-B weather look like?," 2015.
Extended EP Search Report for Application No. 16195189.2-1871 dated Aug. 2, 2017.

* cited by examiner

METHODS AND APPARATUS FOR REDUCING THE SIZE OF RECEIVED DATA TRANSMISSION DURING VEHICLE TRAVEL

TECHNICAL FIELD

Embodiments of the subject matter described herein relate generally to automatic data uplink requests during traveling. More particularly, embodiments of the subject matter relate to eliminating the portion of a data request associated with already-travelled portions of a route.

BACKGROUND

Data associated with geographic areas along a route is useful to vehicle operators traveling the route. Such data may include weather/meteorological data, aeronautical information, navigation data, road conditions data, train-track conditions data, waterway information, traffic information, or the like. Decisions regarding delays, detours, and other variations in travel are more effectively made with the appropriate information available.

An aircraft is one exemplary embodiment of a vehicle that may rely on decision-making data during travel. In this embodiment, data may be transmitted to the aircraft via broadcast to a group of aircraft within a communication area, or via a manually requested transmission to a single aircraft. Both methods of communication transmit data for an entire travel route, resulting in a large data transmission. When the travel route is partially complete, a subset of the data associated with an already-traveled portion of the route is irrelevant to current travel, rendering the large data transmission partially unnecessary. Additionally, both methods of data transfer may be slow and/or expensive, and manually requesting data during travel may be inconvenient and challenging for a flight crew member during flight.

Accordingly, it is desirable to provide a method for obtaining the right amount of data at a vehicle at an appropriate time during travel. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for obtaining updated travel condition data at a vehicle. The method identifies a subset of a predetermined travel route that is ahead of the vehicle, based on a selected distance quantity and a current position of the vehicle during traveling; and requests a set of data for the subset, the updated travel condition data comprising the set of data.

Some embodiments of the present disclosure provide a system for obtaining updated data at a vehicle traveling a predetermined route comprising a plurality of sub-routes. The system includes a communication device onboard the vehicle, the communication device configured to communicate with a remote server; system memory; and at least one processor communicatively coupled to the system memory, the at least one processor configured to: automatically request the updated data associated with one of the plurality of sub-routes, when the vehicle reaches the one of the plurality of sub-routes during traveling.

Some embodiments of the present disclosure provide a method for obtaining data at a vehicle traveling a predetermined route comprising a plurality of sub-routes. The method automatically requests updated travel condition data upon reaching each of the plurality of sub-routes, the updated travel condition data comprising data associated with a next one of the plurality of sub-routes remaining in the predetermined route ahead of the vehicle; and receives the updated travel condition data via data uplink to the vehicle.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods and apparatus for automatically requesting updated data at a vehicle during travel, wherein the data is associated with traveling conditions for particular areas along the travel route. In some embodiments, a graphical user interface (GUI) is provided to receive user input indicating a desired distance value or distance quantity that indicates a portion of the travel route for which the user wishes to obtain updated data. Using a position of the vehicle and the desired distance value, a sub-route is selected, and updated data is automatically requested upon reaching a beginning point of the sub-route.

Certain terminologies are used with regard to the various embodiments of the present disclosure. A predetermined travel route is a defined course for movement of a vehicle, which includes a starting point and an ending point. The predetermined travel route includes one or more sub-routes.

A sub-route may be defined as a subset of the predetermined travel route, and is identified using a user input distance value and a current location of the vehicle. A user input distance value may also be referred to as a user-selected distance quantity or "swath". Travel condition data may be any data applicable to vehicles using the travel route, such as weather/meteorological data, aeronautical information, navigation data, road conditions data, train-track conditions data, waterway information, traffic information, or the like.

Figure 1:
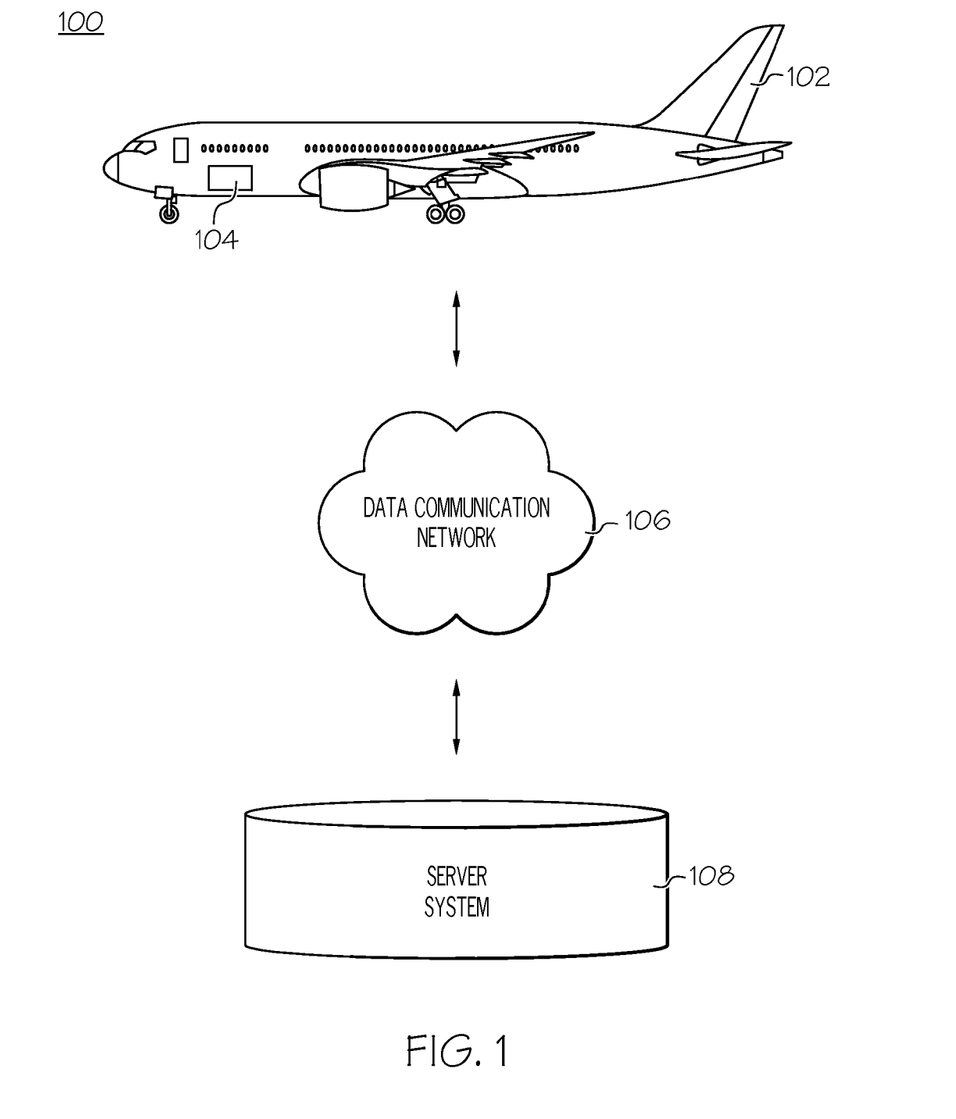
FIG. 1 is diagram of a system for providing data to a vehicle, in accordance with the disclosed embodiments.

Turning now to the figures, FIG. 1 is diagram of a system 100 for providing data to a vehicle (e.g., an aircraft 102), in accordance with the disclosed embodiments. As shown in this particular embodiment, the system 100 includes a server system 108 in communication with a vehicle automatic update system 104 onboard an aircraft 102. It should be appreciated that FIG. 1 depicts a simplified embodiment of the system 100, and that some implementations of the system 100 may include additional elements or components. Further, the system 100 depicted in FIG. 1 is an exemplary embodiment implemented using an aircraft 102. In practice, the system 100 depicted in FIG. 1 may be implemented using any type of vehicle, including but not limited to: any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, or the like.

Figure 2:
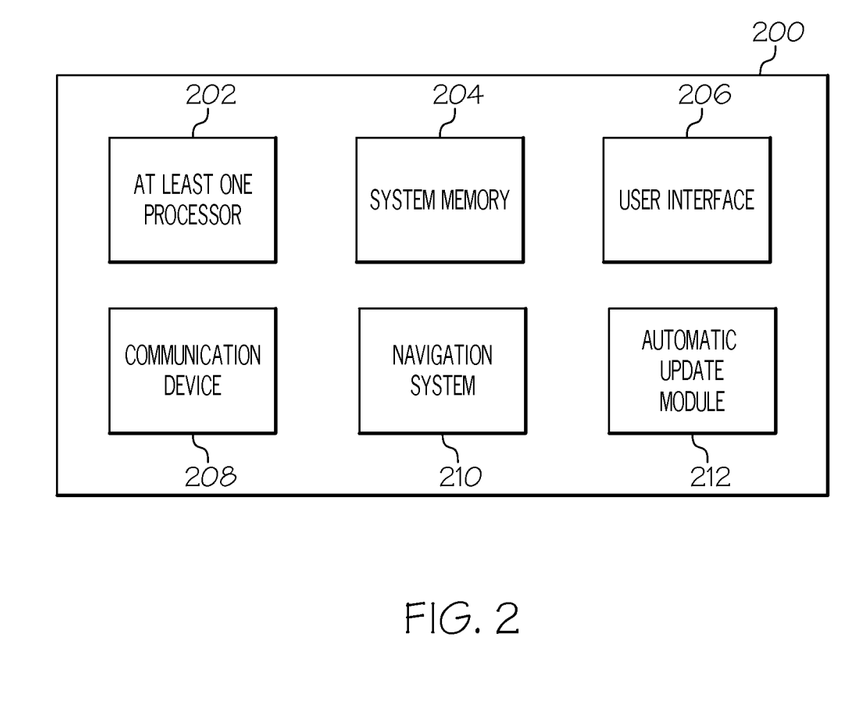
FIG. 2 is a functional block diagram of a vehicle automatic update system, in accordance with the disclosed embodiments.

As shown, the aircraft 102 includes the vehicle automatic update system 104 (described in more detail with regard to FIG. 2). The vehicle automatic update system 104 is capable of communicating with a server system 108 via a data communication network 106. The vehicle automatic update system 104 and the server system 108 are generally disparately located. The vehicle automatic update system 104 is configured to provide formalized and automatically-generated data update requests to the server system 108, and to receive applicable data in response to each request. Requested data may include aeronautical data, meteorological data, terrain data, road condition data, navigation data, or any other type of data applicable to a vehicle traveling a predetermined route.

The server system 108 may include any number of application servers, and each server may be implemented using any suitable computer. In some embodiments, the server system 108 includes one or more dedicated computers. In some embodiments, the server system 108 includes one or more computers carrying out other functionality, in addition to server operations. The server system 108 maintains a database or repository of travel data applicable to the aircraft 102. In the embodiment shown, the server system 108 maintains meteorological or weather data (e.g., MET data), aeronautical information systems (AIS) data, or the like. In embodiments implemented using another type of vehicle, the server system 108 may maintain data including, without limitation: navigation data, road conditions data, train-track conditions data, waterway information, traffic information, or the like.

As noted above, the vehicle automatic update system 104 communicates with the server system 108 via the data communication network 106. In practice, the data communication network 106 may be any digital or other communications network capable of transmitting messages or data between devices, systems, or components. In certain embodiments, the data communication network 106 includes a packet switched network that facilitates packet-based data communication, addressing, and data routing. The packet switched network could be, for example, a wide area network, the Internet, a satellite uplink, or the like. In various embodiments, the data communication network 106 includes any number of public or private data connections, links or network connections supporting any number of communications protocols. The data communication network 106 may include the Internet, for example, or any other network based upon Transmission Control Protocol/Internet Protocol (TCP/IP) or other conventional protocols. In various embodiments, the data communication network 106 could also incorporate a wireless and/or wired telephone network, such as a cellular communications network for communicating with mobile phones, personal digital assistants, and/or the like. The data communication network 106 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

FIG. 2 is a functional block diagram of a vehicle automatic update system 200, in accordance with the disclosed embodiments. It should be noted that the vehicle automatic update system 200 can be implemented with the component 104 depicted in FIG. 1. In this regard, the vehicle automatic update system 200 shows certain elements of the component 104 in more detail. The vehicle automatic update system 200 may include, without limitation: at least one processor 202; system memory 204; a user interface 206; a communication device 208; a navigation system 210; and an automatic update module 212. These elements and features of the vehicle automatic update system 200 may be operatively associated with one another, coupled to one another, or otherwise configured to cooperate with one another as needed to support the desired functionality—in particular, requesting updated conditions data for a predefined route during travel, as described herein. For ease of illustration and clarity, the various physical, electrical, and logical couplings and interconnections for these elements and features are not depicted in FIG. 2. Moreover, it should be appreciated that embodiments of the vehicle automatic update system 200 will include other elements, modules, and features that cooperate to support the desired functionality. For simplicity, FIG. 2 only depicts certain elements that relate to the data update request techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The system memory 204 may be realized using any number of devices, components, or modules, as appropriate to the embodiment. Moreover, the at least one processor 202 could include system memory 204 integrated therein and/or system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the vehicle automatic update system 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The user interface 206 may include or cooperate with various features to allow a user to interact with the vehicle automatic update system 200. Accordingly, the user interface 206 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the vehicle automatic update system 200. For example, the user interface 206 could be manipulated by an operator to set a desired swath, or in other words, a desired distance value for which a user wishes to receive continuous traveling conditions updates during traveling, as described herein.

In certain embodiments, the user interface 206 may include or cooperate with various features to allow a user to interact with the vehicle automatic update system 200 via graphical elements rendered on a display element. Accordingly, the user interface 206 may initiate the creation, maintenance, and presentation of a graphical user interface (GUI). In certain embodiments, the display element implements touch-sensitive technology for purposes of interacting with the GUI. Thus, a user can manipulate the GUI by moving a cursor symbol rendered on the display element, or by physically interacting with the display element itself for recognition and interpretation, via the user interface 206.

The communication device 208 is suitably configured to communicate data between the vehicle automatic update system 200 and one or more remote servers. The communication device 208 may transmit and receive communications over a wireless local area network (WLAN), the Internet, a satellite uplink/downlink, a cellular network, a broadband network, a wide area network, or the like. In certain embodiments, the communication device 208 is implemented as an onboard vehicle communication or telematics system. In embodiments wherein the communication device 208 is a telematics module, an internal transceiver may be capable of providing bi-directional mobile phone voice and data communication, implemented as Code Division Multiple Access (CDMA). In some embodiments, other 3G, 4G, and/or 5G technologies may be used to implement the communication device 208, including without limitation: Universal Mobile Telecommunications System (UMTS) wideband CDMA (W-CDMA), Enhanced Data Rates for GSM Evolution (EDGE), Evolved EDGE, High Speed Packet Access (HSPA), CDMA2000, Evolved High Speed Packet Access (HSPA+), Long Term Evolution (LTE) and/or Long Term Evolution-Advanced (LTE-A).

As described in more detail below, data received by the communication device 208 may include, without limitation: travel conditions data applicable to a particular area, portion, or sub-route of a predetermined travel route, and other data compatible with the vehicle automatic update system 200. Data provided by the communication device 208 may include, without limitation, requests for updated travel condition data, and the like.

The navigation system 210 is deployed onboard the host vehicle. In practice, the navigation system 210 may be implemented as part of an onboard vehicle computer system, an onboard display system, an onboard vehicle instrumentation cluster, or the like. In one practical embodiment, the navigation system 210 is realized as, includes, or cooperates with an onboard global positioning system (GPS) that derives the current geographic position of the vehicle in real-time or substantially real-time. The navigation system 210 is also configured to obtain map data from an appropriate source that provides data indicative of current cartographic, topological, location, road, and possibly other data useful to the navigation system 210. The navigation system 210 is configured to provide navigation data to an operator or crew member of the vehicle. Navigation data may include location data for the vehicle, turn-by-turn driving directions, and/or map information. During operation, the navigation system 210 functions to periodically detect and/or measure a current location for the vehicle. The navigation system 210 may present this location data to an operator of the vehicle via a display element or other presentation device. A current location for the vehicle may be a triangulated position, a latitude/longitude position, or any other notation indicative of the position of the vehicle.

The automatic update module 212 is configured to formalize a request for travel condition data for a particular distance, area, or "swath" of a predetermined travel route, and automatically provides that request on an ongoing basis during travel. The automatic update module 212 receives user input indicating a preferred distance value for which to receive travel condition data. This distance value may also be referred to as a distance quantity, a swath, a numerical length, or the like. For example, a flight crew may provide user input indicating a distance value of 500 nautical miles (NM), indicating that, during flight, the flight crew would like to receive ongoing data transmissions of travel condition data for a 500 NM subset of the predetermined travel route. In this example, the 500 NM subset changes as the aircraft moves along the predetermined travel route.

The automatic update module 212 is further configured to communicate with the navigation system 210 to receive current location data for the vehicle. Using the user input preferred distance value and the current location, the automatic update module 212 identifies a current swath (i.e., a current subset of the predetermined travel route), and future swaths or subsets of the predetermined travel route, which will be reached by the moving vehicle later in time, during travel. Upon reaching each new swath or subset, the automatic update module 212 automatically generates a request for updated travel condition data, wherein the updated travel condition data is associated with current and future swaths or subsets of the predetermined travel route. Here, the automatic update module 212 tailors each request to disregard travel condition data associated with previously-traveled swaths or subsets which are behind the vehicle as the vehicle moves along the predetermined travel route. The automatic update module 212 minimizes the amount of travel condition data received at the vehicle by requesting applicable travel condition data, while not requesting travel condition data for sections of the predetermined travel route that have already passed.

In practice, the automatic update module 212 may be implemented with (or cooperate with) the at least one processor 202 to perform at least some of the functions and operations described in more detail herein. In this regard, the automatic update module 212 may be realized as suitably written processing logic, application program code, or the like.

Figure 3:
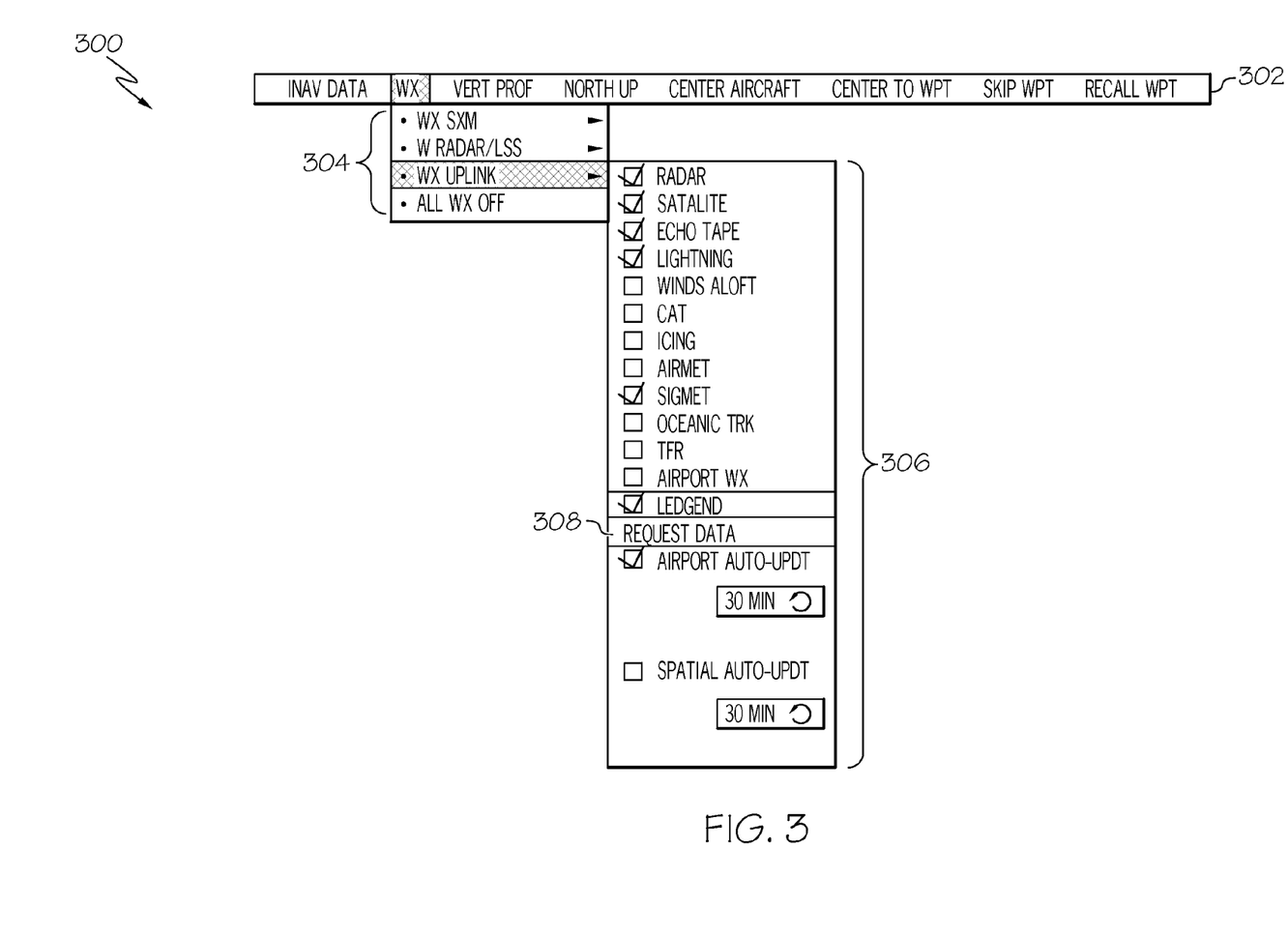
FIG. 3 is a diagram of an exemplary embodiment of a graphical user interface (GUI) for use with a vehicle automatic updating system.

FIG. 3 is a diagram of an exemplary embodiment of a graphical user interface (GUI) 300 for use with a vehicle automatic updating system. Although this particular embodiment depicts options that may be applicable to flight operations, in practice, the menu options may reflect those applicable to other types of vehicles, as described above with respect to FIG. 1. It should be appreciated that the GUI 300 represents a "full featured" embodiment that supports various features described herein. In practice, an implementation of the GUI 300 need not support all of the enhanced features described here and, therefore, one or more of the elements depicted in FIG. 3 may be omitted from other embodiments. Moreover, other implementations of the GUI 300 may include additional elements and features that support conventional functions and operations.

As shown, the GUI 300 includes a ribbon or toolbar 302 that presents a group of drop-down menus for potential user selection. In this particular embodiment, a user has selected a "WX" drop-down menu, indicating that weather information is the subject of the drop-down menu options 304. A user has further selected the "Wx Uplink" option from the drop-down menu options 304. The "Wx Uplink" option refers to uplinked weather information obtained via satellite communications onboard the vehicle (e.g., a satellite uplink from the aircraft).

The user selection of the "Wx Uplink" option opens a second group of menu options 306. Here, the second group of menu options 306 provides the user with the ability to select one or more desired sources of weather information for display, the ability to select a legend for the data, and the ability to set automatic updates using the "Airport auto-updt" and/or "Spatial auto-updt" options.

The "Spatial auto-updt" option is a time interval, set by the user, for automatically updating the information display of travel condition data for a portion of the predetermined travel route. Here, the "Spatial auto-updt" is configured to automatically update the travel condition data every thirty minutes while the vehicle travels the predetermined travel route. In other words, travel condition data will be uplinked thirty minutes after a previous uplink. For example, a flight crew member may wish to continually have weather information that extends about 2000 NM ahead of aircraft, as the aircraft travels along the flight path (i.e., predetermined travel route). In a first uplink, weather information is displayed for the area 2000 NM ahead of a current location of the aircraft. However, after thirty minutes have passed, the aircraft is in a second location, and the 2000 NM area ahead of the aircraft is a second 2000 NM area. This, however, applies only if automatic update option is selected.

Once the user has checked the appropriate boxes for the second group of menu options 306, the user may click a "Request data" link 308 to open a dialog box applicable to the automatic updating feature onboard the vehicle. The user selects the "Request data" link 308 in order to set parameters for the receipt of automatic updates to travel condition data at the vehicle which is, in this case, an aircraft. Travel condition data updates may be requested for a particular distance from the vehicle, or in other words a "swath", of a predetermined travel route that begins with the vehicle itself. The distance value or swath value stays the same until a user reconfigures the requested automatic travel condition data updates. However, as the vehicle travels along the predetermined travel route, thereby changing a current location of the vehicle, the area of interest changes and new travel condition data will be requested automatically, based on the pre-selected values. This new travel condition data is applicable to the current location of the vehicle and the desired swath ahead of the current location of the vehicle.

Figure 4:
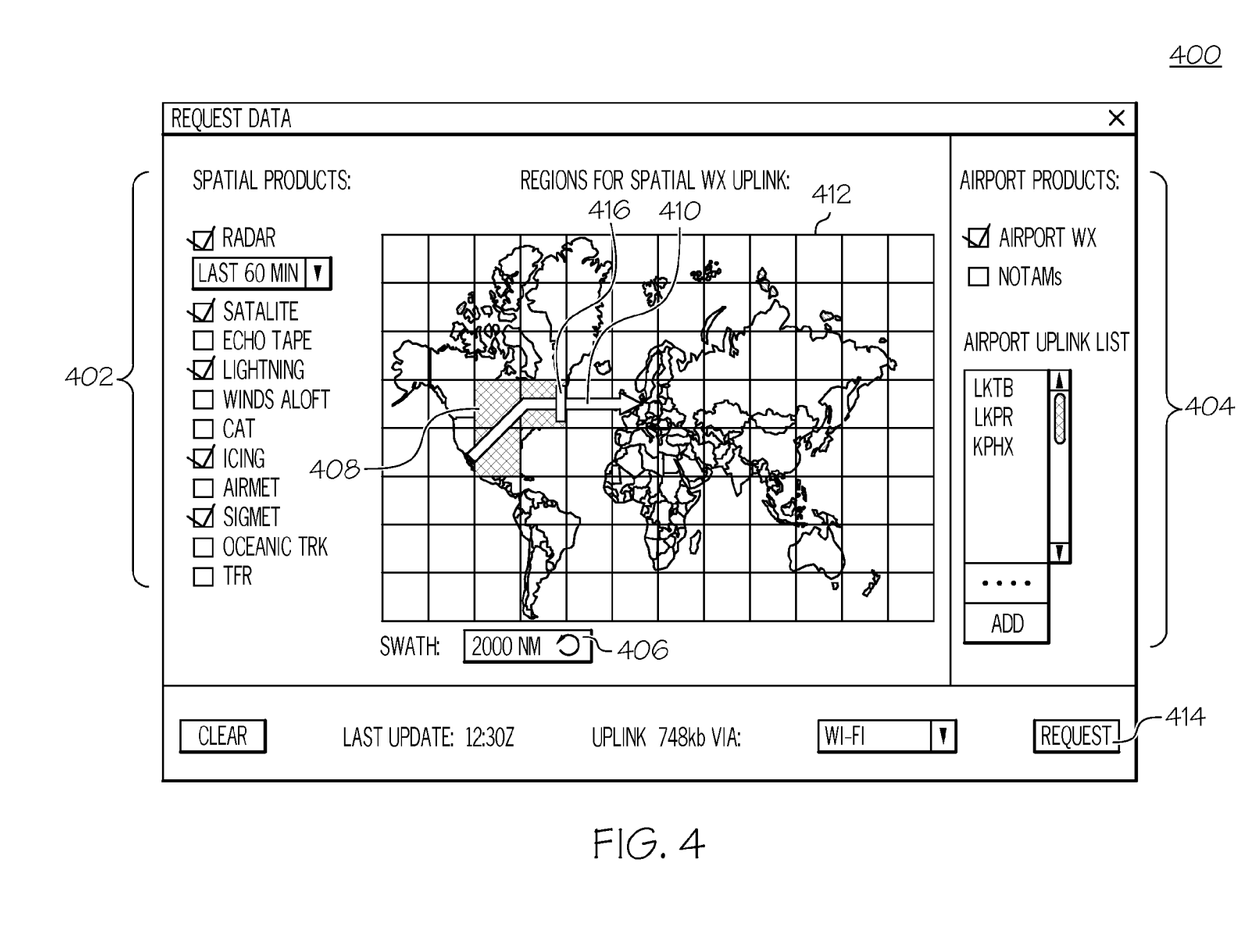
FIG. 4 is another diagram of an exemplary embodiment of a graphical user interface (GUI) for use with a vehicle automatic updating system.

FIG. 4 illustrates the "Request Data" dialog box 400 for user-configuration of the requested travel condition updates in more detail. On the left side of the "Request Data" dialog box 400, the user-selected options 402 from the previous menu (referenced previously as the second group of menu options 306 in FIG. 3) are shown. The previous menu, shown in FIG. 3, permitted a user to select weather information for display. However, the options presented in FIG. 4 permit a user to request the data uplink. On the right side of the "Request Data" dialog box 400, options 404 are available for user selection for automatic updates, including airport products and airport selections for uplink. In this example, a user may select airport products including airport weather ("Airport Wx") and/or a Notice to Airmen (NOTAM), which is a written notification issued to pilots before a flight, advising them of circumstances relating to the state of flying. Additionally in this example, a user may highlight an acronym appropriate to a particular airport and click the "Add" button in order to add airports to the uplink list. Here, a flight crew member can insert information into the empty field " - - - " to enter an ICAO code of an airport and add it to the list of airports which will be uplinked. The Other airports are pre-selected based on the flight plan. Options 404 are presented in the interest of completeness and to provide context for the current disclosure, and it should be appreciated that other user-selectable options and/or menus may be presented to the user, in addition to or in the place of the current exemplary embodiment.

In the center of the "Request data" dialog box 400 is a graphic 412 depicting the predetermined travel route 410. Below the graphic 412 is a swath selection option 406, in which a user may select a distance value or swath value of interest. In the example shown, a user has selected a swath of 2000 nautical miles (NM). In other embodiments, the swath value may use other distance units, such as miles or kilometers. Once the user has made selections from the user-selected options 402 and the options 404, and provided user input selecting a chosen swath value, then the user clicks the "Request" link 414 in order to formalize this request for the system to use the formalized request during travel of the predetermined travel route 410.

Here, a user has selected a swath value of 2000 NM, and the system generates a visual representation of a sub-route 408 of the predetermined travel route on the graphic 412. The sub-route 408 is a subset or portion of the predetermined travel route that has been determined using the user-selected swath value and a current location of the aircraft. In this example, the visual representation of the sub-route 408 includes three squares covering the area of interest. This area of interest is located in front of the aircraft on the predetermined travel route, and does not include parts of the predetermined travel route that have already been traveled and are behind the aircraft on the route.

As the aircraft travels along the predetermined travel route, the system continuously and dynamically recalculates an appropriate area of interest (i.e., a sub-route 408) based on the user-selected update time (shown in FIG. 3: "Spatial auto-updt"), the user-selected swath 406 and the location of the aircraft. The system then continuously and dynamically obtains updated travel condition data based on the current area of interest. In the example shown, any time the request is formulated, the area of interest or sub-route 408 includes 2000 NM ahead of the aircraft.

There are two options for formulating a new area of interest at the system: (1) by manual request or automatic request driven by area (when aircraft reaches the end of the pre-selection), or (2) at the time of automatic update (e.g., every 30 minutes a new update is formulated)—whichever of the two occurs first. In this particular embodiment, the graphic 412 will show an updated sub-route 408, in which the squares representing the user-selected swath are moved forward on the predetermined travel route 410, representing the new location of the vehicle. As the vehicle moves along the predetermined travel route 410, this process continues in order to automatically request updated travel condition data applicable to the areas of the predetermined travel route 410 that are ahead of the vehicle.

Figure 5:
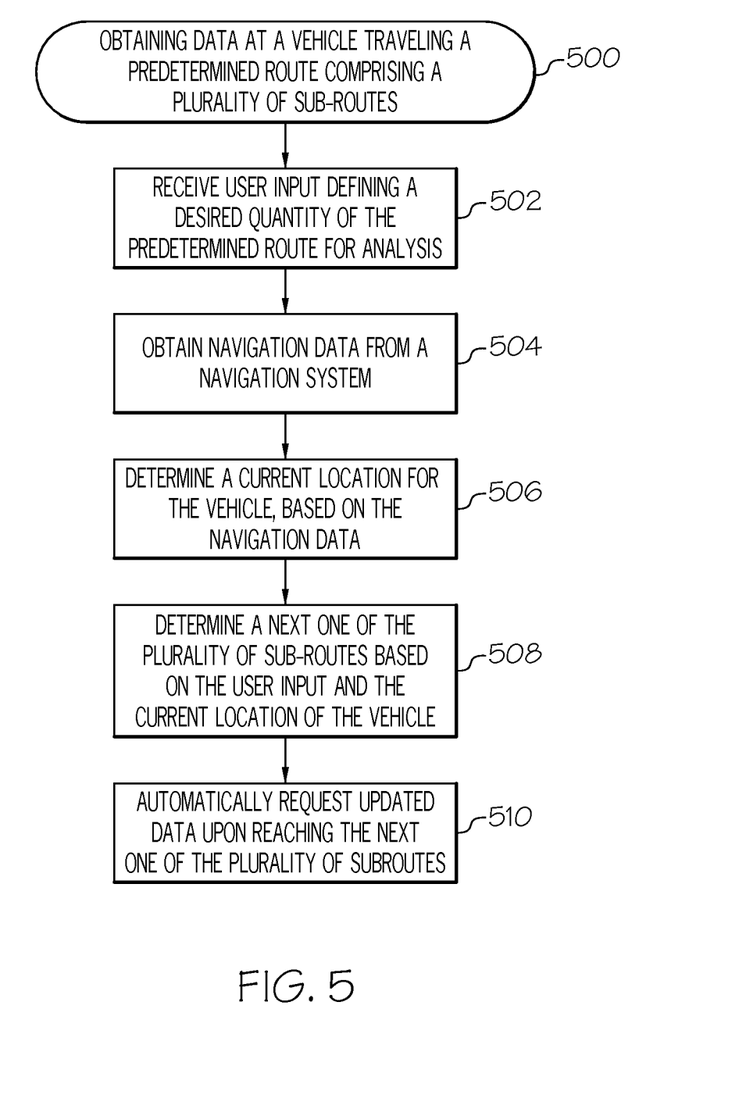
FIG. 5 is a flowchart that illustrates an embodiment of a process for obtaining data at a vehicle traveling a predetermined route comprising a plurality of sub-routes.

FIG. 5 is a flowchart that illustrates an embodiment of a process 500 for obtaining data at a vehicle traveling a predetermined route comprising a plurality of sub-routes. The various tasks performed in connection with process 500 may be performed by software, hardware, firmware, or any combination thereof. For illustrative purposes, the following description of process 500 may refer to elements mentioned above in connection with FIGS. 1-4. In practice, portions of process 500 may be performed by different elements of the described system. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. Moreover, one or more of the tasks shown in FIG. 5 could be omitted from an embodiment of the process 500 as long as the intended overall functionality remains intact.

For ease of description and clarity, this example assumes that the process 500 begins by receiving user input defining a desired quantity of the predetermined route for analysis (step 502). A user may indicate a desired distance value or "swath" value which indicates an area or distance along the route for which travel condition data may be useful to the vehicle. Travel condition data for an entire predetermined travel route may be an amount of data that is too large for practical purposes (e.g., too large for download, too large for storage onboard the vehicle), and the travel conditions for areas located at the end of the route may change during travel, rendering the already-downloaded data obsolete. To address this issue, the process 500 allows the user may select a shorter distance or smaller area along a predetermined travel route for which to receive travel condition data.

The process 500 then obtains navigation data from a navigation system onboard the vehicle (step 504), and determines a current location for the vehicle, based on the navigation data (step 506). In exemplary embodiments, the navigation data is obtained from a navigation system onboard the vehicle. However, in certain embodiments, the navigation data may be obtained via communication with a remote server or other system external to the vehicle.

Next, the process 500 determines a next one of the plurality of sub-routes based on the user input and the current location of the vehicle (step 508). Each sub-route is determined using a user-selected distance value or "swath" value and a current location of the vehicle. The next one of the plurality of sub-routes is the next, upcoming sub-route ahead of the vehicle as it moves along the predetermined travel route. This next, upcoming sub-route includes a length determined using the user input swath value. User input indicating a selected swath value may include a numerical length or a time value. When the user provides a numerical length, then the process 500 uses the input value directly in defining a sub-route along the predetermined travel route. Here, the starting point of the sub-route is the current location of the vehicle, and the sub-route extends the length of the user input distance value ahead of the current location of the vehicle. When the user provides a time value, then the process 500 uses the user input time value to calculate a distance value that the vehicle is capable of traveling during that time. Here again, the starting point of the sub-route is the current location of the vehicle, and the sub-route extends the length of the calculated distance value ahead of the current location of the vehicle.

Once the next one of the plurality of sub-routes has been determined (step 508), the process 500 automatically requests updated data upon reaching the next one of the plurality of sub-routes (step 510). The updated travel condition data is applicable to the sub-route identified by the current location of the vehicle and the user-input distance or time value. Each time the vehicle reaches a new sub-route of the predetermined travel route, the process 500 formalizes a request for updated travel condition data. Here, the process 500 has identified the next subset that the vehicle will reach while traveling, using the user input distance value or user input time value and the current location of the vehicle. This formalized request is created by selecting the next sub-route and de-selecting all sub-routes that have already been traveled by the vehicle.

Steps 508-510 are repeated, continuously, while the vehicle travels the predetermined travel route, in order to continuously identify travel condition data applicable to a new, current sub-route through which the vehicle is or will be traveling. For example, the process 500 may identify a second sub-route of the predetermined travel route, based on the distance quantity and a second position of the vehicle during traveling, wherein the second position of the vehicle is detected later in time than the current position of the vehicle (and is further along the predetermined travel route). The process 500 then requests a second set of data for the second sub-route.

The current sub-route includes a current location of the vehicle, and extends forward from the current location to an endpoint defined by the user-selected distance value. The user-selected distance value may be any chosen value, up to and potentially including the entire length of the predetermined travel route. The second sub-route includes a new location of the vehicle which is further along the predetermined travel route, and also extends from the new location to an endpoint defined by the user-selected distance value. As described previously, the current sub-route extends from a current location of the vehicle into the area of the predetermined travel route ahead of the vehicle, and does not include areas of the predetermined travel route that have already been traveled and are behind the vehicle.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for obtaining updated travel condition data onboard an aircraft during flight, the method comprising:
    obtaining a current position of the aircraft, by at least one processor communicatively coupled to a navigation system onboard the aircraft;
    receiving user input indicating a selected distance quantity of a predetermined travel route, via a user interface communicatively coupled to the at least one processor;
    identifying:
        a current subset of the predetermined travel route that is ahead of the aircraft, by the at least one processor, based on the selected distance quantity and the current position of the aircraft during traveling; and
        future subsets of the predetermined travel route, based on the selected distance quantity and previously-traveled subsets behind the aircraft during travel;
    requesting a set of data for the current subset, via a communication device communicatively coupled to the at least one processor, the set of data comprising aeronautical information system (AIS) data and meteorological (MET) data for the current subset, the updated travel condition data comprising the set of data;
    receiving the set of data, via a satellite uplink to a communication device onboard the aircraft, in response to requesting the set of data;
    presenting the set of data onboard the aircraft, via a display element communicatively coupled to the at least one processor;
    automatically requesting updated data for one of the future subsets when the aircraft reaches the one of the future subsets, based on a later position of the aircraft and the selected distance quantity, wherein the updated data comprises AIS data and MET data for the one of the future subsets;
    receiving the updated data, via the satellite uplink to the communication device onboard the aircraft, in response to automatically requesting the updated data; and
    presenting the updated data onboard the aircraft, via the display element.

2. The method of claim 1, wherein requesting the set of data further comprises:
   automatically generating a request for the set of data, when the aircraft reaches the subset during traveling; and
   submitting the request.

3. The method of Claim 1, wherein the user input comprises a numerical length of the predetermined travel route; and
   wherein the selected distance quantity comprises the numerical length.

4. The method of Claim 1, wherein receiving the user input comprises:
   receiving an input time value; and
   determining a distance that the aircraft is capable of traveling during the input time value;
   wherein the selected distance quantity comprises the distance.

5. The method of claim 1, further comprising:
   identifying a second subset of the predetermined travel route, based on the distance quantity and a second position of the aircraft during traveling, the second position being later in time than the current position of the aircraft; and
   requesting a second set of data for the second subset, the updated travel condition data comprising the second set of data.

6. The method of claim 1, wherein the set of data comprises meteorological data associated with the subset of the predetermined travel route.

7. The method of claim 1, wherein the set of data comprises aeronautical data associated with the subset of the predetermined travel route.

8. A system for obtaining updated travel condition data onboard an aircraft, the system comprising:
   a communication device onboard the aircraft, the communication device configured to communicate with a remote server, via a satellite uplink, to obtain aeronautical information system (AIS) data and meteorological (MET) data;
   a navigation system onboard the aircraft, the navigation system configured to obtain a current position of the aircraft using navigation system data;
   a user interface configured to receive user input indicating a selected distance quantity of a predetermined travel route;
   a display element configured to present aeronautical information system (AIS) data and meteorological (MET) data for the aircraft during flight;
   system memory; and
   at least one processor communicatively coupled to the communication device, the navigation system, the user interface, the display element, and the system memory, the at least one processor configured to:
      obtain the current position of the aircraft, via the navigation system onboard the aircraft;
      receive the user input indicating the selected distance quantity of the predetermined travel route, via the user interface communicatively coupled to the at least one processor;
      identify:
         a current subset of the predetermined travel route that is ahead of the aircraft, based on the selected distance quantity and the current position of the aircraft during traveling; and
         future subsets of the predetermined travel route, based on the selected distance quantity and previously-traveled subsets behind the aircraft during travel;
      request a set of data for the current subset, via the communication device, the set of data comprising the AIS data and the MET data for the current subset, the updated travel condition data comprising the set of data;
      receive the set of data, via the satellite uplink to the communication device, in response to requesting the set of data;
      present the set of data onboard the aircraft, via the display element;
      automatically request updated data for one of the future subsets when the aircraft reaches the one of the future subsets, based on a later position of the aircraft and the selected distance quantity, wherein the updated data comprises the AIS data and the MET data for the one of the future subsets;
      receive the updated data, via the satellite uplink to the communication device, in response to automatically requesting the updated data; and
      present the updated data onboard the aircraft, via the display element.

9. The system of claim 8, wherein the at least one processor is configured to request the set of data by:
   automatically generating a request for the set of data, when the aircraft reaches the subset during traveling; and
   submitting the request via the communication device.

10. The system of Claim 8, wherein the user input comprises a numerical length of the predetermined travel route; and
    wherein the selected distance quantity comprises the numerical length.

11. The system of claim 8, wherein the user interface is configured to receive the user input by:
    receiving an input time value; and
    determining a distance that the aircraft is capable of traveling during the input time value;
    wherein the selected distance quantity comprises the distance.

12. The system of claim 8, wherein the at least one processor is further configured to:
    identify a second subset of the predetermined travel route, based on the distance quantity and a second position of the aircraft during traveling, the second position being later in time than the current position of the aircraft; and
    request a second set of data for the second subset, via the communication device, the updated travel condition data comprising the second set of data.

13. The system of claim 8, wherein the set of data comprises meteorological data associated with the subset of the predetermined travel route.

14. The system of claim 8, wherein the set of data comprises aeronautical data associated with the subset of the predetermined travel route.

* * * * *